(12) United States Patent
Myers

(10) Patent No.: US 12,419,457 B2
(45) Date of Patent: Sep. 23, 2025

(54) COFFEE MACHINES

(71) Applicant: Mavam LLC, Seattle, WA (US)

(72) Inventor: Michael Myers, Seattle, WA (US)

(*) Notice: Subject to any disclaimer, the term of this patent is extended or adjusted under 35 U.S.C. 154(b) by 839 days.

(21) Appl. No.: 17/716,344

(22) Filed: Apr. 8, 2022

(65) Prior Publication Data

US 2023/0320521 A1    Oct. 12, 2023

(51) Int. Cl.
*A47J 31/36* (2006.01)
*A47J 31/40* (2006.01)
*A47J 31/46* (2006.01)

(52) U.S. Cl.
CPC .......... *A47J 31/40* (2013.01); *A47J 31/3619* (2013.01); *A47J 31/462* (2013.01); *A47J 31/3604* (2013.01); *A47J 31/3671* (2013.01)

(58) Field of Classification Search
CPC .... A47J 31/36; A47J 31/3604; A47J 31/3609; A47J 31/3619; A47J 31/3671; A47J 31/462; A47J 31/54
USPC ................................. 99/291, 302 P
See application file for complete search history.

(56) References Cited

U.S. PATENT DOCUMENTS

| | | | |
|---|---|---|---|
| 5,650,186 A | 7/1997 | Annoni et al. | |
| 8,996,178 B2 | 3/2015 | Studor et al. | |
| 9,427,106 B2 | 8/2016 | Carbonini et al. | |
| 9,924,828 B2 * | 3/2018 | Grassia | A47J 31/0652 |
| 10,368,682 B2 | 8/2019 | Radhakrishnan et al. | |
| 10,595,671 B2 * | 3/2020 | Ottavi | A47J 31/465 |
| 2009/0293733 A1 | 12/2009 | Martin et al. | |
| 2009/0308255 A1 * | 12/2009 | Coccia | A47J 31/465 99/281 |
| 2015/0245734 A1 | 9/2015 | Vogelsang et al. | |
| 2019/0053656 A1 * | 2/2019 | Locher | A47J 31/542 |
| 2019/0357720 A1 * | 11/2019 | Abbiati | A47J 42/38 |
| 2023/0330914 A1 * | 10/2023 | Hofmeister | A47J 31/542 |

FOREIGN PATENT DOCUMENTS

WO    WO-0143610 A1 *  6/2001 .......... A47J 31/3609

* cited by examiner

*Primary Examiner* — Reginald Alexander
(74) *Attorney, Agent, or Firm* — Miller IP Law; Devin Miller

(57) ABSTRACT

Described herein are examples of a system which include a boiling system and a dispensing system. The boiling system includes a primary boiler to heat hot water, a holding boiler to maintain the hot water, a brew group to receive the hot water from the holding boiler, and a heated transfer hose to receive a beverage component from the brew group and apply heat to the beverage component. The brew group includes a motor, a tamp to form a puck, a heated brew chamber to extract a beverage component, a load cell to measure a weight of the brew group, a heating element to heat the brew chamber, a spray to press the puck out, and an ejector to sweep the puck away. The dispensing system is coupled to the heated transfer hose to dispense the beverage component at a set point temperature.

20 Claims, 5 Drawing Sheets

COFFEE MACHINES

BACKGROUND

Coffee machines use hot water to extract coffee and dispense the coffee. The water may be heated to a desired temperature and delivered to perform the extraction. To reduce fluctuation in the temperature of the water, conventional coffee machines position the water heating mechanism as close as possible to the extraction mechanism and the dispensing mechanism. However, such an arrangement can be bulky and occupy valuable working space.

BRIEF DESCRIPTION OF THE DRAWINGS

The present description will be understood more fully when viewed in conjunction with the accompanying drawings of various examples of coffee or espresso machines. The description is not meant to limit the coffee machines to the specific examples. Rather, the specific examples depicted and described are provided for explanation and understanding of coffee machines. Throughout the description the drawings may be referred to as drawings, figures, and/or FIGs.

DETAILED DESCRIPTION

Figure 1:
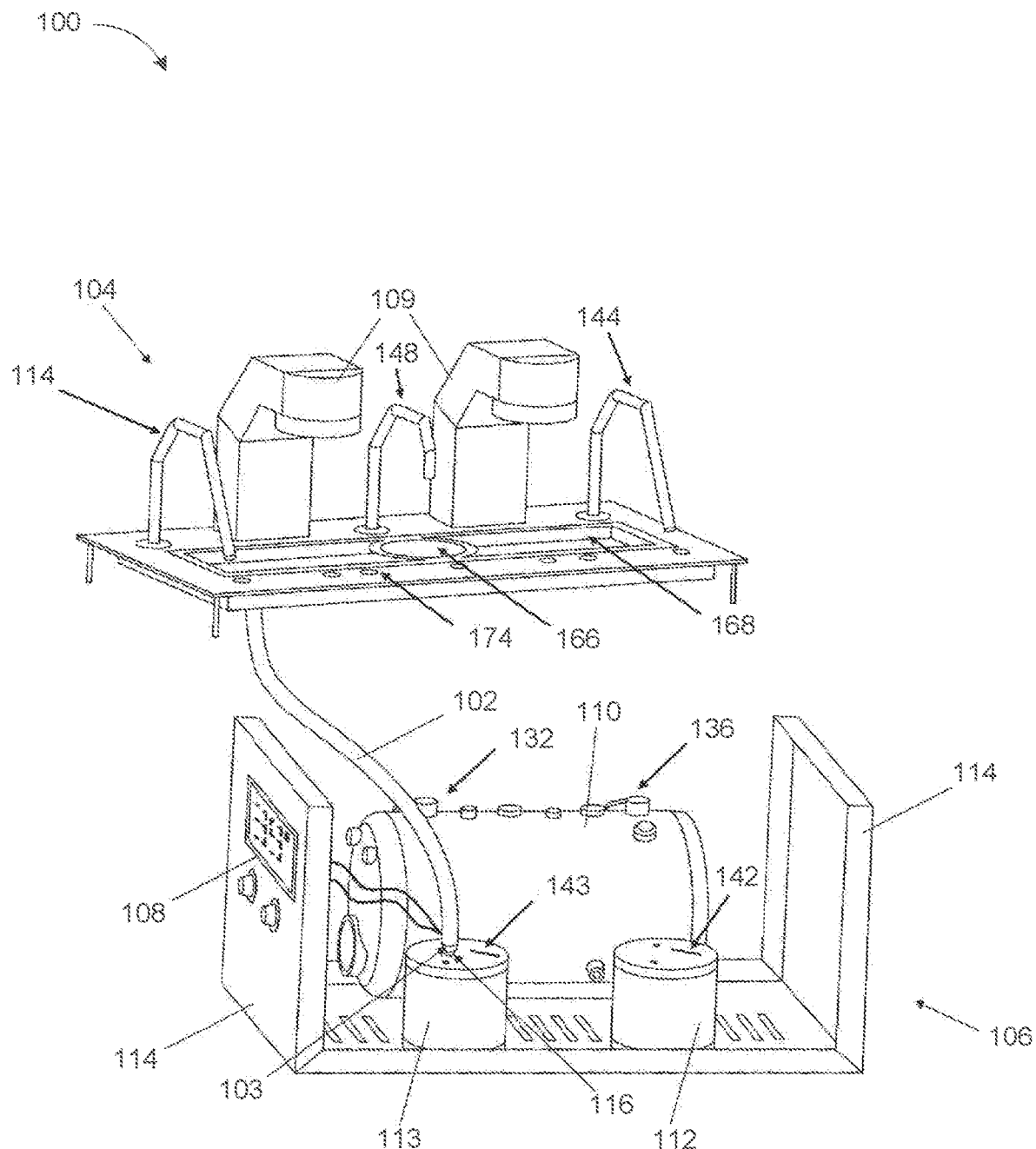
FIG. 1 illustrates a perspective view of a system with a housing removed, according to an embodiment.

Coffee machines, as disclosed herein, will become better understood through a review of the following detailed description in conjunction with the figures. The detailed description and figures provide merely examples of the various embodiments of espresso machines. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

Conventional coffee machines may include a single unified housing. The singular housing tends to be bulky. The bulk is especially present in commercial units that require large amounts of water. Larger boilers are used to accommodate the higher output of product. Larger boilers lead to larger machines which means less room on the counter for the user to work on. Additionally, larger espresso machines require a significant amount of space, often block views, prevent interaction between employees and customers, and, employee-customer interaction, along with good coffee, is important for achieving that iconic coffee shop atmosphere that draws and retains loyal customers.

Super-automatic machines provide a more effective utilization of counter space by separating serving components to be above a counter or serving surface with the remaining components disposed beneath the counter or serving surface. This requires a relatively smaller footprint on the serving surface. However, temperature stability is critical to the nature of high-quality coffee and espresso. The separated arrangement of the super-automatic system creates a difficulty in maintaining temperature stability from water intake through product dispensing. Embodiments described herein provide temperature stability through the use of dual boiler arrangements, heated brew groups, and heated transfer lines.

Another critical component for the brewing of high-quality coffee and espresso is consistency of the puck formation process. While some brewing groups may provide a close approximation of quantity and compression of the puck, embodiments presented herein incorporate load measurement capabilities which provide a consistent, repeatable, and tunable dosing, tamping, and brewing process and, thus, a consistent and repeatable recipe. By positioning a load measurement component to measure the brew group, a higher level of accuracy and repeatability can be achieved resulting in a greater consistency and a greater degree of precision of adjustment of the recipe.

Embodiments presented herein provide an improvement in cost of manufacture, purchase, and maintenance. While many conventional machines use both a tamping motor and an ejector motor, this adds both cost and complexity. Embodiments described herein provide a single motor arrangement providing operation of the brew group to both tamp the puck and eject the puck. This provides a lower cost to provide the system and to maintain the system and may further reduce the physical space required by the system.

FIG. 1 is a perspective view depicting a coffee machine ("system") 100. In some embodiments, the system 100 may include a removable electrically-heated hose ("heated hose") 102 providing fluid transfer between two independent systems. The independent systems may include a dispensing system 104 and a boiler system 106. The system 100 may include an electronic temperature control unit ("ETCU") 108. The dispensing system 104 and the boiler system 106 may be independent of one another and installed at separate locations away from one another. For example, the dispensing system 104 may be positioned in/on a counter or other serving surface. The boiler system 106 may be displaced from the serving surface, such as in a cabinet or shelf above, below, or off to one side or another relative to the dispensing system 104. In some embodiments, the boiler system 106 may be coupled to the dispensing system via the heated hose 102 to allow fluid to be transferred from the boiling system 106 to the dispensing system 104 for dispensing beverages including coffee, espresso, and/or other coffee-based beverages.

The dispensing system 104 may be used for beverage preparation. In some embodiments, the dispensing system 104 may have one or more group heads 109 that dispenses fluid that is heated in the boiler system 106 and transferred through the heated hose 102 to one or more of the group heads 109. To avoid heat loss during the fluid transfer process such as during the transfer of fluid from the boiler system 106 to the dispensing system 104, the one or more group heads 109 may have a heating coupled to or incorporated into one or more of the group heads 109. The heating element may be powered by an electronic temperature control unit such as a proportional-integral-derivative ("PID") controller or control loop. The dispensing system 104 may use steam or hot water to create different beverages or may dispense espresso or other beverages directly. The one or more group heads 109 may have steam and hot water output means that may be spouts, spigots, and wands such as steam output 144 and hot water output 148. After steaming of extracted espresso, residual material, such as milk and coffee remains, may be left to clean. The dispensing system 104 may include a drain 168 and/or a rinser 166. The rinser 166 may be a device that uses incoming cold or hot water and has a small actuator that opens when you press down on the rinser 166, supplying water to clean. The dispensing system 104 may also include one or more buttons 174 for activating corresponding valves and/or pumps to create coffee-based drinks or the like. For instance, the buttons 174 may include a steam valve actuation button, which activates a pump for extracting espresso, turns on a brew valve letting water flow from the one or more group heads 109, and activates a hot water valve.

In some embodiments, the boiler system 106 may include an ETCU 108, a primary boiler 110, a holding boiler 112, a brew group 113, and a housing 114 to hold the boiler system 106 in place. A boiler system 106 is generally where all incoming electrical power and water is taken into the system 100 forming a beverage making machine such as an espresso machine. The water is heated, coffee product may be extracted, and power, steam, hot water, and other resources may be distributed to all other components of the machine. The housing 114 may house boilers used for creating steam and hot water, which may include the primary boiler 110 and the holding boiler 112, respectively. The incoming water enters the primary boiler 110, which may have heat exchangers (132 and 136) built into the primary boiler 110. The primary boiler may have water run through the center of the primary boiler 110 vertically or otherwise. The water used to create steam and the steam vapor heats the heat exchanger metal which heats water passing through heat exchangers 132 and 136. The heated water then moves from heat exchangers 132 and 136 to the holding boiler 112.

The holding boiler 112 maintains the water at the set point temperature to provide water with little to no variation from the set point temperature prior to being supplied to the brew group 113. The holding boiler 112 may have a greater or lesser fluid capacity relative to the primary boiler 110.

The ETCU 108 may control and regulate the temperature of the water in the primary boiler 110, the holding boiler 112, and/or the brew group 113. The holding boiler 112 may take the incoming heated water and add a small amount of cold restricted water through a water restrictor input 142 to keep the water close to the extraction temperature set point. In some embodiments, the holding boiler 112 omits a cold-water intake and/or the water restrictor input 142.

The ETCU 108 may control the primary boiler 110 to heat water to a set point that is different from the holding boiler 112. For example, the primary boiler 110 may be set to a higher set point temperature to provide steam or initial heating of the water while the holding boiler 112 is set to a lower set point temperature that is an extraction set point temperature for espresso extraction or the like. In some embodiments, the holding boiler 112 maintains and regulates the water temperature at a predetermined extraction temperature set point needed to create coffee set by the user through the ETCU 108. A removable electrically heated hose 102 may be fastened to the brew group 113 at a nozzle 116 or opening, and the espresso, water, and/or other beverage and/or beverage component may be transferred from the brew group 113 to the dispensing system 104 through the heated hose 102. The primary boiler 110 may also heat water and create steam pressure for cleaning or other applications.

In some embodiments, the heated hose 102 regulates and maintains the temperature of fluid in the system 100 when water travels from the boiler system 106 to the dispensing system 104. Once fluid has been heated to optimal or the desired temperature in the boiler system 106, the fluid needs to be transferred from the boiler system 106 to the dispensing system 104. To prevent temperature or energy loss in the fluid as the fluid travels from boiler system 106 to the dispensing system 104, a user can enter a predetermined temperature level in an ETCU 108 which would heat the heated hose 102 to the predetermined temperature level and maintain the level to prevent fluctuations in water temperature. Any heated water or fluids that pass through the heated hose 102 once the predetermined temperature level has been set will not lose energy or heat as it travels through the heated hose 102 in this state. Heated hoses 102 may also be incorporated between other components in the boiler system 106 such as between the primary boiler 110 and the holding boiler 112 and/or between the holding boiler 112 and the brew group 113. The temperature level of heated hose 102 may be adjustable and can create different levels of super-heated and saturated mixtures as desired, such as for steaming milk.

In some embodiments, the heated hose 102 may have a heated tip 103 powered by an electrical connection and wires connected to an ETCU 108, and this heated tip eliminates any heat loss at a valve system to hose junction. This is important because surface area temperature within the group head 109 has to be consistent with the temperature set by the user through the PID controller to achieve temperature control. The one or more group heads 109 may have heating elements built in and work with the solenoid valve to keep the system within the chambered group head housing at any desired temperature.

In some embodiments, the brew group 113 is removable for cleaning, inspection, maintenance, or the like. The brew group 113 may be secured in place with screws or other hardware that are easily disengaged to allow for removal of the brew group 113 from the system 100.

Figure 2:
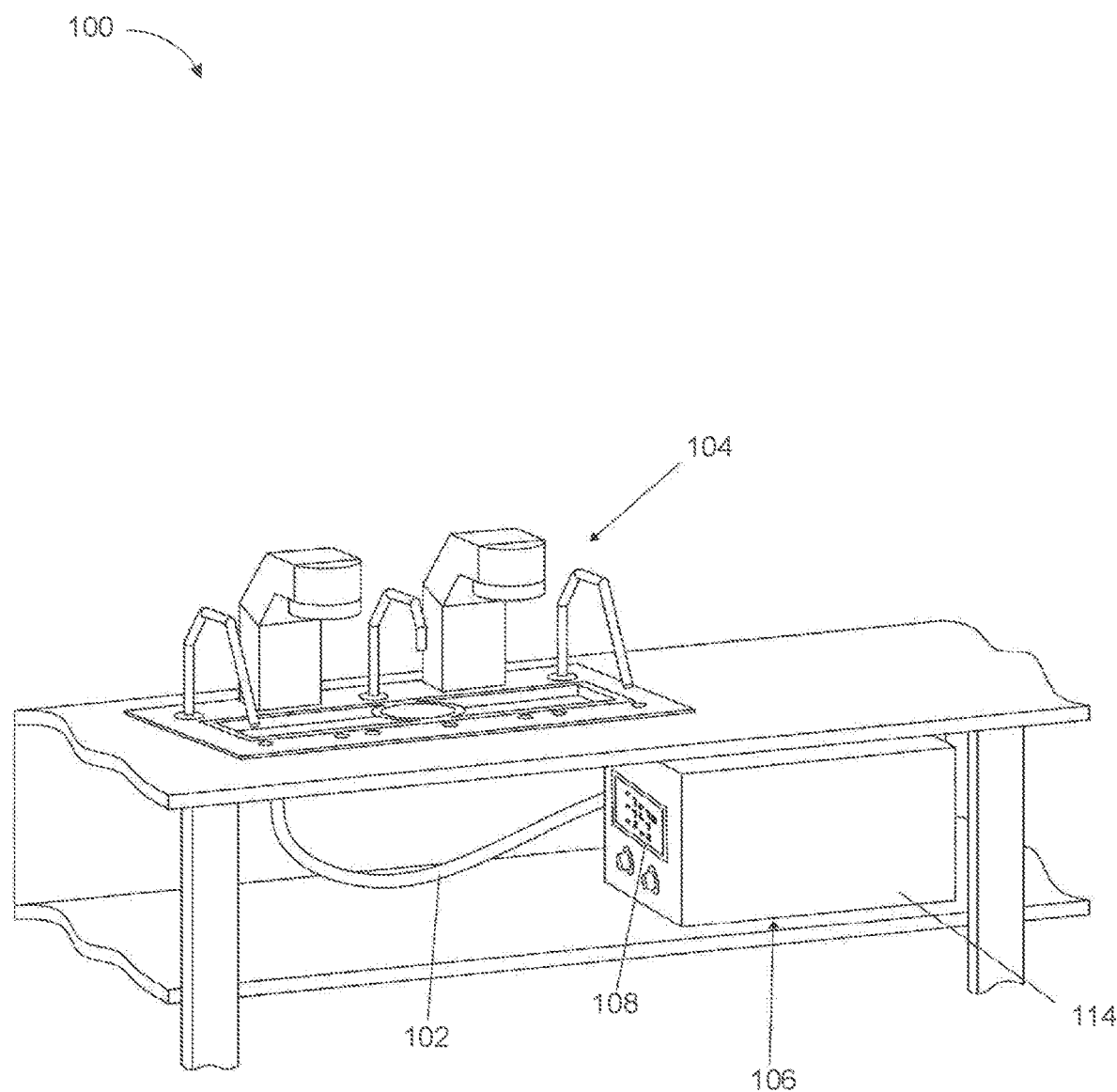
FIG. 2 illustrates a perspective view of the system of FIG. 1, according to an embodiment.

FIG. 2 illustrates a perspective view of the system of FIG. 1. In one or more embodiments, the dispensing system 104 and the boiler system 106 may be separately installed away from the dispensing system 104 and at any distance desired by the user. A user may use a heated hose 102 of any desired predetermined length to connect the dispensing system 104 to the boiler system 106. The heated hose 102 allows the dispensing system 104 and the boiler system 106 to be located separately at any desirable predetermined length and with proper temperature regulation. This proper temperature regulation prevents heat loss during the transfer of fluids from the boiler system 106 to the dispensing system 104 when a user wishes to pull fluids and create a beverage without compromising the quality of the beverage that would otherwise occur if heat or energy is lost during the transfer of fluid from the boiler system 106 to the dispensing system 104.

Figure 3:
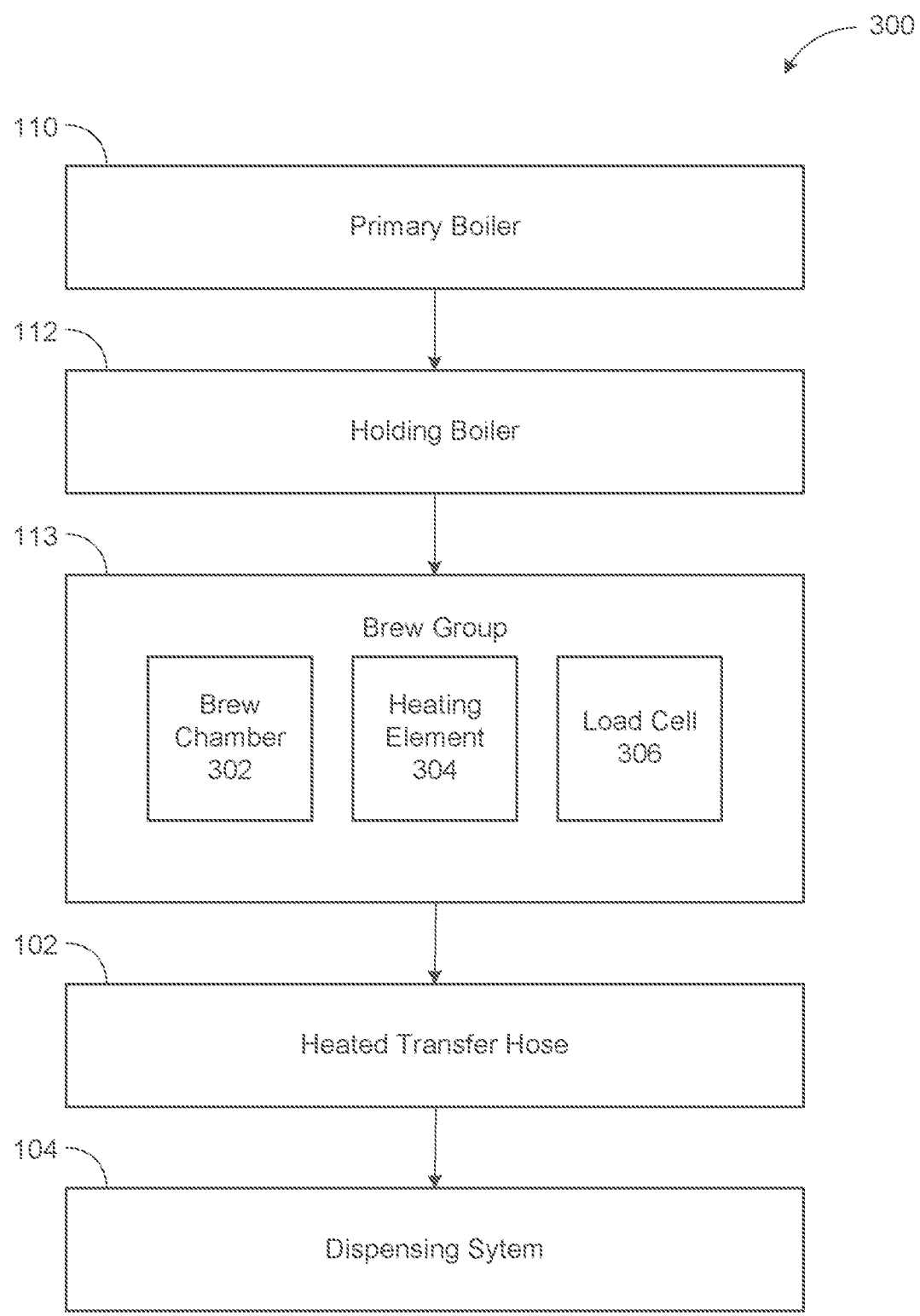
FIG. 3 illustrates a view of a piston of the system of FIG. 1, according to an embodiment.

FIG. 3 is a flow chart depicting the flow of water through the system 100. Embodiments may provide a temperature stabilized flow path from beginning to end.

In some embodiments, the water may be distributed through and/or by the system 100 once the user has chosen a desired temperature to use water to create a beverage. The water flows into the primary boiler 110 where it may be heated to a set point temperature. The primary boiler 110 may be managed by the ETCU 108.

The water may be directed from the primary boiler 110 to the holding boiler 112. The holding boiler 112 may be configured to hold and maintain the water at the set point temperature. The holding boiler 112 may keep the same set point temperature as the primary boiler 110 or it may keep a set point temperature that is higher or lower than that of the primary boiler 110 based on a control signal from the ETCU 108. In some embodiments, the holding boiler 112 is similar in size to the primary boiler 110. In other embodiments, the holding boiler 112 is different in size from the primary boiler 110. For example, the holding boiler 112 may be larger than the primary boiler 110 or the holding boiler 112 may be smaller than the primary boiler 110. The primary boiler 110 and the holding boiler 112 may be connected by a fluid transfer line. The fluid transfer line may be heated or unheated, flexible, semi-flexible, or rigid, include a sensor or lack sensors, or so forth.

In some embodiments, the holding boiler 112 supplies heated water to the brew group 113. In some embodiments, the holding boiler 112 is coupled to the brew group 113 via a fluid transfer line that may be heated or unheated. In some embodiments, one or more sensors may be position on or between the holding boiler 112 and/or the brew group 113.

In some embodiments, the brew group 113 includes a brew chamber 302, a heating element 304, and a load cell 306. The brew chamber 302 may receive the heated water from the holding boiler 112 and supply the heated water to a puck or other beverage element disposed in the brew chamber 302 to extract a beverage or beverage component. The brew chamber 302 may be heated by the heating element 304 to reduce thermal loss and cooling of the water/beverage at the brew chamber 302 of the brew group 113. In some embodiments, the heating element 304 is in communication with the ETCU 108 to control a heating of the piston assembly 302. The heating element 304 may be positioned to wrap at least partially around the brew chamber 302 to heat the brew chamber 302 where the puck is positioned or where the water has a relatively higher dwell time within the brew group 113. The heating element 304 may be an electric heater or solid state or liquid state heater. Other manners of delivering heat to the brew chamber 302 to maintain the water/beverage at the set point temperature are also contemplated.

In some embodiments, a load cell 306 is incorporated into the brew group 113 to provide an accurate dosing of the puck or other beverage component. In some embodiments, the load cell 306 is configured to weigh the entire brew group 113 to determine, for example, a dose of ground coffee bean supplied to the brew group 113. The measurement from the load cell 306 may be used to start or stop a delivery of grounds to the brew chamber 302. In some embodiments, the measurement provided by the load cell 306 may be used to determine a puck compaction pressure, an amount of water to supply to the brew chamber 302, a flow rate of water to supply to the brew chamber, or other variables.

The brew group 113 may provide the beverage or beverage component to the dispensing system 104 via the heated transfer hose 102. The heated transfer hose 102 may allow for temperature stability of the beverage or beverage component from the brew group 113 to the dispensing system 104. Temperature stability may provide resistance to degradation in the quality of the beverage or beverage component. The heated transfer hose 102 may be coupled to the ETCU 108 to maintain the beverage or beverage component at the set point temperature corresponding to a service temperature desired at the dispensing system 104. The heated transfer hose 102 may be heated along at least a portion of a length of the heated transfer hose 102 and/or may have a heating element disposed at an end of the heated transfer hose 102.

Figure 4:
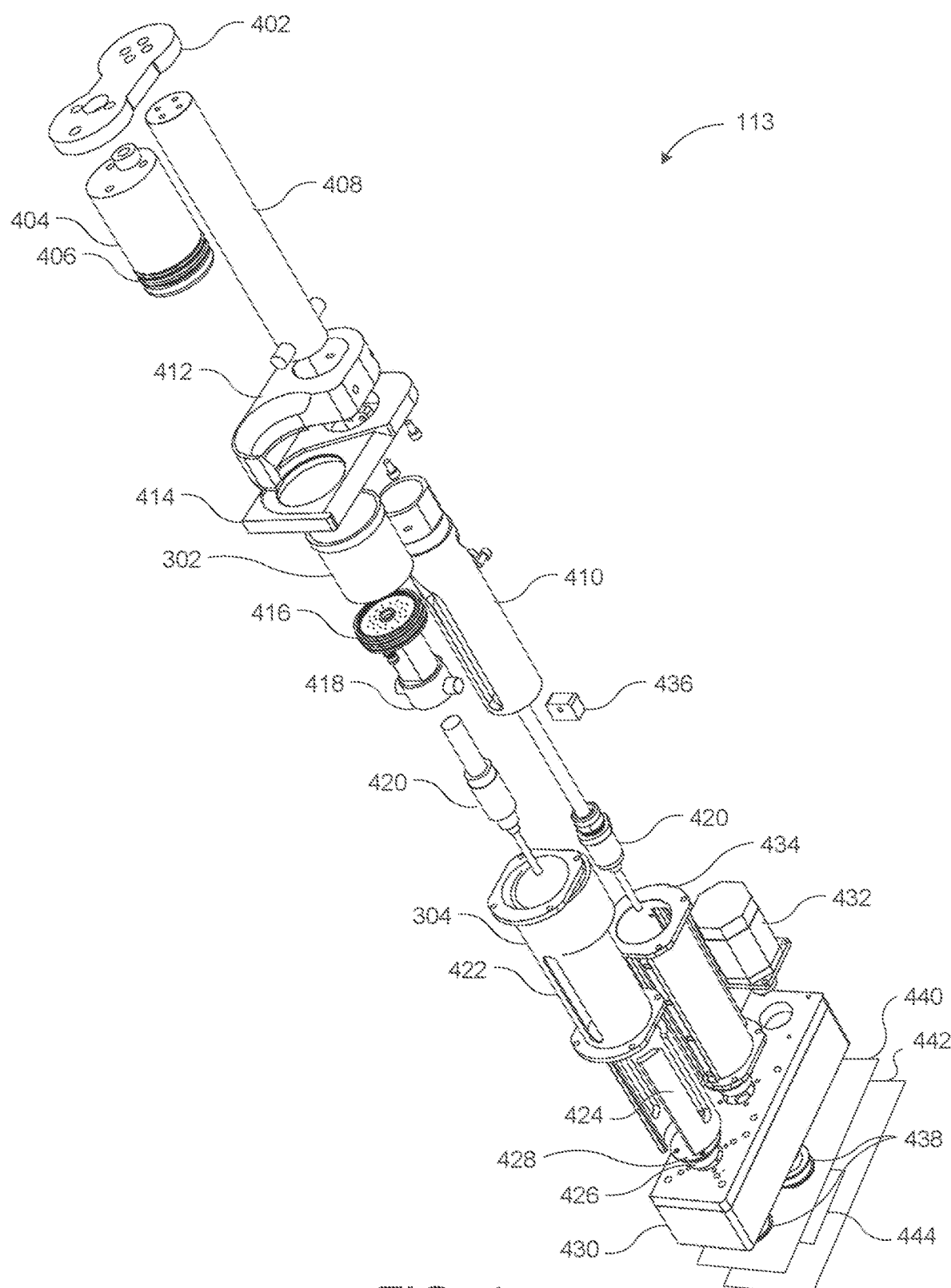
FIG. 4 illustrates an exploded view of the system of FIG. 1, according to an embodiment.

FIG. 4 illustrates an exploded view of the brew group 113 of the system 100 of FIG. 1, according to an embodiment. Embodiments may provide a single-motor arrangement providing tamping and ejection of a puck.

In some embodiments, the brew group 113 includes a piston tamp holder 402. The piston tamp holder 402 may be configured to hold a piston tamp 404. The piston tamp 404 is coupled to the piston tamp holder 402 and is configured to engage with the brew chamber 302. The piston tamp 404 may include an extraction screen to allow extracted fluid to flow from the brew chamber 302, through the piston tamp 404, and to the dispensing system 104 without carrying particulates through.

The piston tamp 404 may include an O-ring 406 or multiple O-rings 406 to seal the piston tamp 404 relative to the brew chamber 302. The O-ring 406 may be flexible, semi-rigid, or rigid. The O-ring 406 may be positioned on the piston tamp 404 and/or may be positioned in the brew chamber 302. In some embodiments, the O-ring 406 is positioned in a channel formed on the piston tamp 404 and/or the brew chamber 302. In other embodiments, the O-ring 406 may be surface mounted or integrated with the piston tamp 406 and/or the brew chamber 302.

The brew group 113 may include a piston ball screw tower 408. The piston ball screw tower 408 may be cylindrical or approximately cylindrical to house components and interface with an ejector guide 410 to eject a spent puck from the brew chamber 302. Posts in the piston ball screw tower 408 may engage with slots in the ejector guide 410 to allow for axial translation of the piston ball screw tower 408 and rotation of the piston ball screw tower 408 about its axis to rotate the piston tamp 404 and an ejector 412.

The ejector 412 forms a hook to at least partially surround the piston tamp 404 in the tamping position and to sweep the spent puck out of the brew group 113 in response to rotation of the piston ball screw tower 408. In some embodiments, the ejection of the spent puck is assisted by a piston top plate 414. The piston top plate 414 may be configured to couple the piston ball screw tower 408 to the ejector guide 410. The piston top plate 414 may be positioned to pass over a top of the brew chamber 302 to eject the spent puck.

The brew chamber 302 may be sized to receive a spray 416. The spray 416 may supply heated water into the brew chamber 302 to extract the beverage or beverage component from the puck within the brew chamber 302. The spray 416 may supply the heated water to the puck in a direction opposite gravity. The spray 416 may include a screen to prevent particulates from entering the spray 416. The spray 416 may include an O-ring or multiple O-rings to form a seal between the spray 416 and the brew chamber 302. The spray 416 may include a spray guide 418 formed in an end of the spray 416.

In some embodiments, free-wheeling ball screws 420 are incorporated to provide axial movement of the brew group 113. For example, a ball screw 420 may be positioned to engage with the spray 418 to provide relative movement of the spray 416 through the brew chamber 302 to receive and eject the puck. The ball screw 420 may be positioned to be at least partially coaxial with the spray 418 and a support sleeve 422. The support sleeve 422 may be sized to receive the spray 416 and the brew chamber 302. The support sleeve 422 may include the heating element 304.

The heating element 304 may be positioned on the support sleeve 422 to apply heat to the brew chamber 302. The heating element 304 may be positioned in the support sleeve 422 to contact the brew chamber 302 and/or provide radiative heating on the brew chamber 302 during infusion of the puck. The heating element 304 may wrap entirely around the brew chamber 302 or may wrap around at least a portion of the brew chamber 302.

The support sleeve 422 may be sized to house a shaft guide 424. The shaft guide 424 may engage the spray 416 at the spray guide 418 to provide an axial translation of the spray 416 within the brew chamber 302. In some embodiments, the shaft guide 424 is coupled to a bearing 426 and bearing holder 428 which may facilitate rotational movement. The bearing 426 and bearing holder 428 may form an interface between the shaft guide 424 and a piston main frame 430. The piston main frame 430 may form a platform for mounting of the shaft guide 424, a motor 432, and a piston guide shaft 434. The piston main frame 430 may include ball screw gears 438 to transfer drive power from the motor 432 to the ball screws 420. The motor 432 is configured to drive movement of the entire brew group 113 for tamping the puck in the brew chamber 302, opening the brew chamber 302 to press out the spent puck, and ejecting the puck with the ejector 412 in a sweeping motion to ready the brew chamber 302 for another dose and infusion. The piston guide shaft 434 is configured to house the ball screw 420 and the ejector guide 410. The piston guide shaft 434 allows for linear movement of the ejector guide 410.

In some embodiments, the brew group 113 may include one or more reed switches 436. For example, the reed switch 436 may be positioned to detect an empty status of a grinder assembly that feeds grounds into the brew chamber 302.

The brew group 113 also includes a load cell arrangement coupled to the piston main frame 430. The load cell arrangement may include an upper plate 440 and a lower plate 442. The upper plate 440 and lower plate 442 may surround a load cell 444. The load cell 444 may be configured to obtain a load or weight measurement of the brew group 113. This may allow for precise measurement of the shot provided to the brew chamber 302 for tamping. Information provided by the load cell 444 may allow for control of a grinder to provide a start and/or stop signal for consistent and accurate puck size once a target weight value of the brew group 113 is reached. This enables a consistent beverage recipe that can be finely tuned to provide a high-quality beverage product. Use of the load cell 444 may allow for improved ease of calibration of the system 100 without the need for a calibration measurement or manual calibration. This reduces cost, time, and effort in providing a calibrated and accurate shot of espresso or other beverage component.

Figure 5:
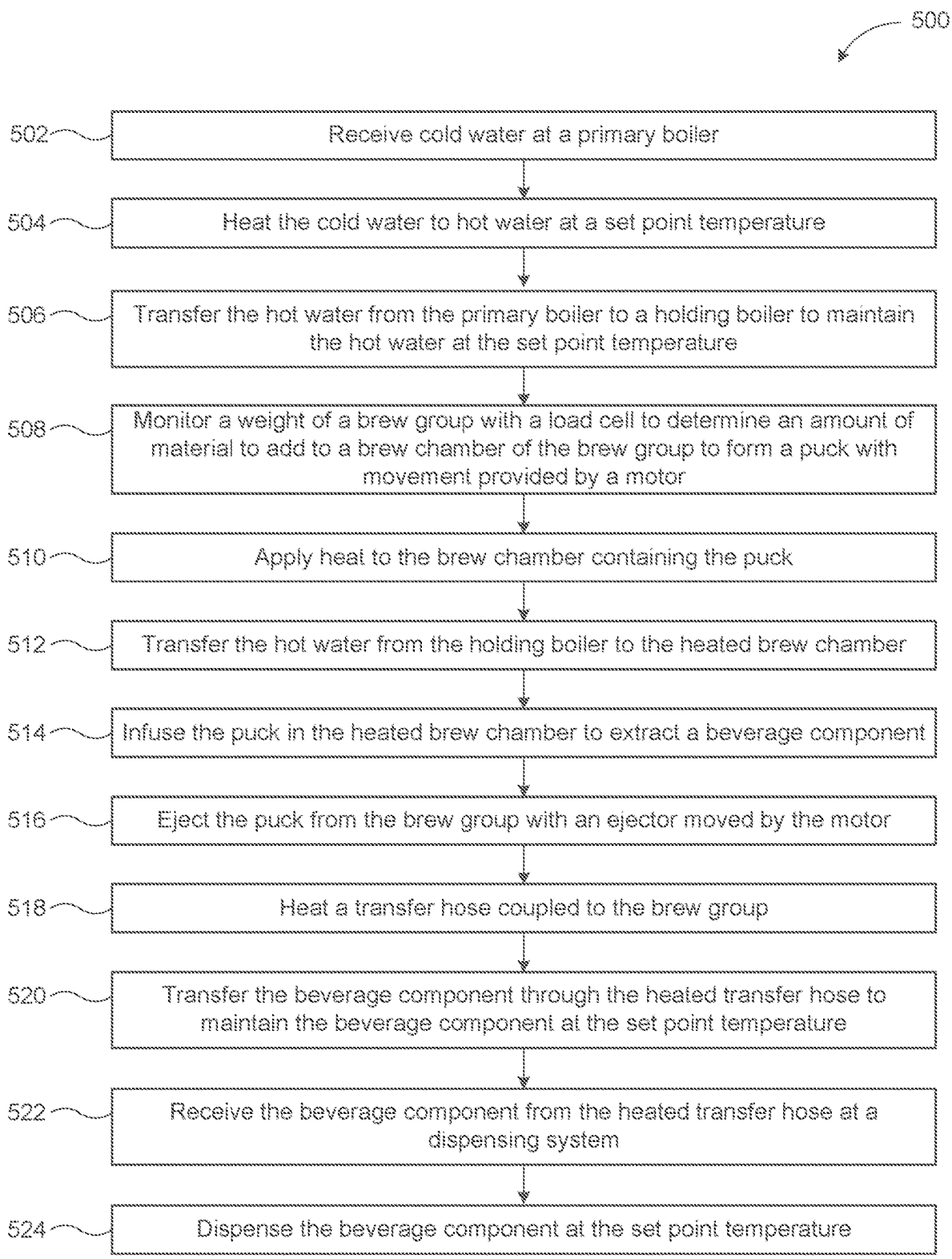
FIG. 5 illustrates a method.

FIG. 5 illustrates a method 500. Embodiments of the method 500 provide for rapid and consistent brewing of beverages or beverage components.

The method 500 may include receiving cold water at a primary boiler 110 (at block 502). In some examples, the primary boiler 110 is configured to receive the cold water from a cold water source such as a tap, reservoir, or the like.

The method 500 may include heating the cold water to hot water at a set point temperature (at block 504). In some embodiments, the primary boiler 110 may apply thermal energy to the cold water to raise the temperature of the cold water and form the hot water at the set point temperature. The set point temperature may be set by a user or may be automatically configured based on a recipe, beverage, beverage component, or the like that is to be supplied.

The method 500 may include transferring the hot water from the primary boiler 110 to a holding boiler 112 to maintain the hot water at the set point temperature (at block 506). For example, the hot water may be moved from the primary boiler 110 to the holding boiler 112 by the opening of a valve and through pressure provided by a water source or by other means.

The method 500 may include monitoring a weight of a brew group 113 with a load cell 306 to determine an amount of material to add to a brew chamber 302 of the brew group 113 to form a puck with movement provided by a motor 432 (at block 508). For example, the load cell 306 may be configured to tare itself before the brew group 113 is loaded and then weigh the brew group 113 after the brew group 113 is loaded.

The method 500 may include applying heat to the brew chamber 302 containing the puck (at block 5010). For example, a heating element 304 may be positioned to surround, at least partially surround, or otherwise in thermal communication with the brew chamber 302 to provide thermal energy to the brew chamber 302.

The method 500 may include transferring the hot water from the holding boiler 112 to the heated brew chamber 302 (at block 512). For example, the hot water may be transported from the holding boiler 112 to the heated brew chamber 302 in response to a successful measurement of the brew group 113 by the load cell 306.

The method 500 may include infusing the puck in the heated brew chamber 302 to extract a beverage component (at block 514). For example, the puck may be infused from the bottom up by providing the hot water into the puck and allowing the hot water to diffuse through the puck.

The method 500 may include ejecting the puck from the brew group 113 with an ejector 412 moved by the motor 432 (at block 516). For example, as the brew group 113 finishes the infusion, the motor 432 may activate to swing the ejector 412 to eject the puck from the brew group 113.

The method 500 may include heating a transfer hose 102 coupled to the brew group 113 (at block 518). For example, the transfer hose 102 may include a heating element corresponding to all or a portion of the transfer hose 102 to maintain the beverage product at the set point temperature.

The method 500 may include transferring the beverage component through the heated transfer hose 102 to maintain the beverage component at the set point temperature (at block 520). For example, the heated transfer hose 102 may have heat applied continuously or in response to transfer of the beverage component through the heated transfer hose 102.

The method 500 may include receiving the beverage component from the heated transfer hose 102 at a dispensing system 104 (at block 522). For example, the heated transfer hose 102 may extent from the boiler system 106 to the dispensing system 104 to carry the beverage component to the dispensing system 104.

The method 500 may include dispensing the beverage component at the set point temperature (at block 524). For example, the dispensing system 104 may, in response to user input or through automatic stimulus, dispense the beverage component at the set point temperature. In some embodiments, maintaining the beverage component at the set point temperature allows for dispensing of a higher quality beverage component without loss of thermal energy through the brewing process.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e., methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the element's A, B, C, and D. Unless otherwise stated, an example including a list of alternatively inclusive elements does not preclude other examples that include various combinations of some or all of the alternatively inclusive elements. An example described using a list of alternatively inclusive elements includes at least one element of the listed elements. However, an example described using a list of alternatively inclusive elements does not preclude another example that includes all of the listed elements. And an example described using a list of alternatively inclusive elements does not preclude another example that includes a combination of some of the listed elements. As used herein regarding a list, "and/or" forms a list of elements inclusive alone or in any combination. For example, an example described as including A, B, C, and/or D is an example that may include A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower, or equal in scope to the original claims, are to be considered within the subject matter of the examples described herein.

The invention claimed is:
1. A system, comprising:
a boiling system configured to receive cold water and heat the water to a set point temperature, the boiling system comprising:
a primary boiler configured to receive the cold water and heat the cold water to hot water heated to the set point temperature;

a holding boiler configured to receive the hot water from the primary boiler and maintain the hot water in the holding boiler at the set point temperature;

a brew group to receive the hot water from the holding boiler, the brew group comprising:
  a motor;
  a tamp configured to move under force from the motor to form a puck;
  a heated brew chamber configured to accept the tamp to form the puck and infuse the puck with the hot water and extract a beverage component;
  a load cell positioned at a bottom of the brew group and configured to measure an overall weight of the brew group to determine an amount of material to be added to the heated brew chamber to form the puck;
  a heating element configured to heat the brew chamber to the set point temperature;
  a spray configured to move under force from the motor to press the puck out of the heated brew chamber after extraction of the beverage component; and
  an ejector configured to sweep the puck away from the brew chamber under force from the motor after extraction of the beverage component; and a heated transfer hose to receive the beverage component from the brew group and apply heat to maintain the beverage component at the set point temperature; and a dispensing system coupled to the heated transfer hose to receive the beverage component from the brew group and dispense the beverage component at the set point temperature.

2. The system of claim 1, a ball screw to transfer movement of the motor to at least one of the tamp, the brew chamber, the spray, or the ejector.

3. The system of claim 1, wherein the heating element is positioned to surround the heated brew chamber.

4. The system of claim 1, further comprising a piston top plate adjacent the ejector to assist in removal of the puck from the heated brew chamber after extraction of the beverage component.

5. The system of claim 1, wherein the tamp comprises a screen to reduce particulate passage into the tamp from the puck.

6. The system of claim 1, wherein the spray is configured to provide the hot water to the puck in a direction opposite gravity.

7. The system of claim 1, the spray further comprises a screen to reduce infiltration of particulate into the spray.

8. The system of claim 1, further comprising a piston main frame configured to support the motor, the ejector, the heated brew chamber, the spray, and the tamp and translate the force from the motor to move the ejector, the spray, and the tamp relative to the piston main frame.

9. A method, comprising:
receiving cold water at a primary boiler;
heating the cold water to hot water at a set point temperature;
transferring the hot water from the primary boiler to a holding boiler to maintain the hot water at the set point temperature;
monitoring a weight of a brew group with a load cell to determine an amount of material to add to a brew chamber of the brew group to form a puck with movement provided by a motor;
sending a signal from the load cell to a grinder assembly to stop the grinder assembly in response to detecting a target weight value at the load cell;
applying heat to the brew chamber containing the puck;
transferring the hot water from the holding boiler to the heated brew chamber;
infusing the puck in the heated brew chamber to extract a beverage component;
ejecting the puck from the brew group with an ejector moved by the motor;
heating a transfer hose coupled to the brew group;
transferring the beverage component through the heated transfer hose to maintain the beverage component at the set point temperature;
receiving the beverage component from the heated transfer hose at a dispensing system; and
dispensing the beverage component at the set point temperature.

10. The method of claim 9, further comprising:
taring the load cell prior to adding the material to the brew chamber; and
adding the material to the brew chamber until the load cell detects a target weight value of the brew group.

11. The method of claim 9, wherein ejecting the puck from the brew group with the ejector comprises sweeping the ejector across the heated brew chamber under force of the motor.

12. The method of claim 9, wherein infusing the puck comprises supplying the hot water in a direction opposite gravity.

13. The method of claim 9, further comprising detecting a state of a grinder assembly with a switch.

14. The method of claim 9, further comprising controlling at least one of the primary boiler, the holding boiler, the heated brew chamber, or the heated transfer hose via an electronic temperature control unit.

15. A device, comprising:
a primary boiler configured to receive cold water and heat the cold water to hot water heated to a set point temperature;
a holding boiler configured to receive the hot water from the primary boiler and maintain the hot water in the holding boiler at the set point temperature;
a brew group to receive the hot water from the holding boiler, the brew group comprising:
  a motor;
  a tamp configured to move under force from the motor to form a puck;
  a heated brew chamber configured to accept the tamp to form the puck and infuse the puck with the hot water and extract a beverage component;
  a load cell to measure a weight of the brew group to determine an amount of material to be added to the heated brew chamber to form the puck;
  a switch to detect a state of a grinder assembly;
  a heating element configured to heat the brew chamber to the set point temperature;
  a spray configured to move under force from the motor to press the puck out of the heated brew chamber after extraction of the beverage component; and
  an ejector configured to sweep the puck away from the brew chamber under force from the motor after extraction of the beverage component; and
a heated transfer hose to receive the beverage component from the brew group and apply heat to maintain the beverage component at the set point temperature within the heated transfer hose.

16. The device of claim 15, wherein the primary boiler is further configured to generate steam.

17. The device of claim 15, wherein the holding boiler is configured to receive the hot water from the primary boiler without receiving cold water into the holding boiler.

18. The device of claim 15, further comprising a ball screw gear coupled to the motor to carry force from the motor.

19. The device of claim 15, further comprising an ejector guide to translate linear movement of the ejector to rotational movement of the ejector to sweep the puck away from the brew chamber.

20. The device of claim 15, wherein a signal is sent from the load cell to the grinder assembly to stop the grinder assembly in response to detecting a target weight value at the load cell.

* * * * *